April 4, 1961  R. D. McGUIRE  2,977,636
METHOD OF MOLDING A HOLLOW RUBBER ARTICLE
Filed Aug. 5, 1958  3 Sheets-Sheet 1
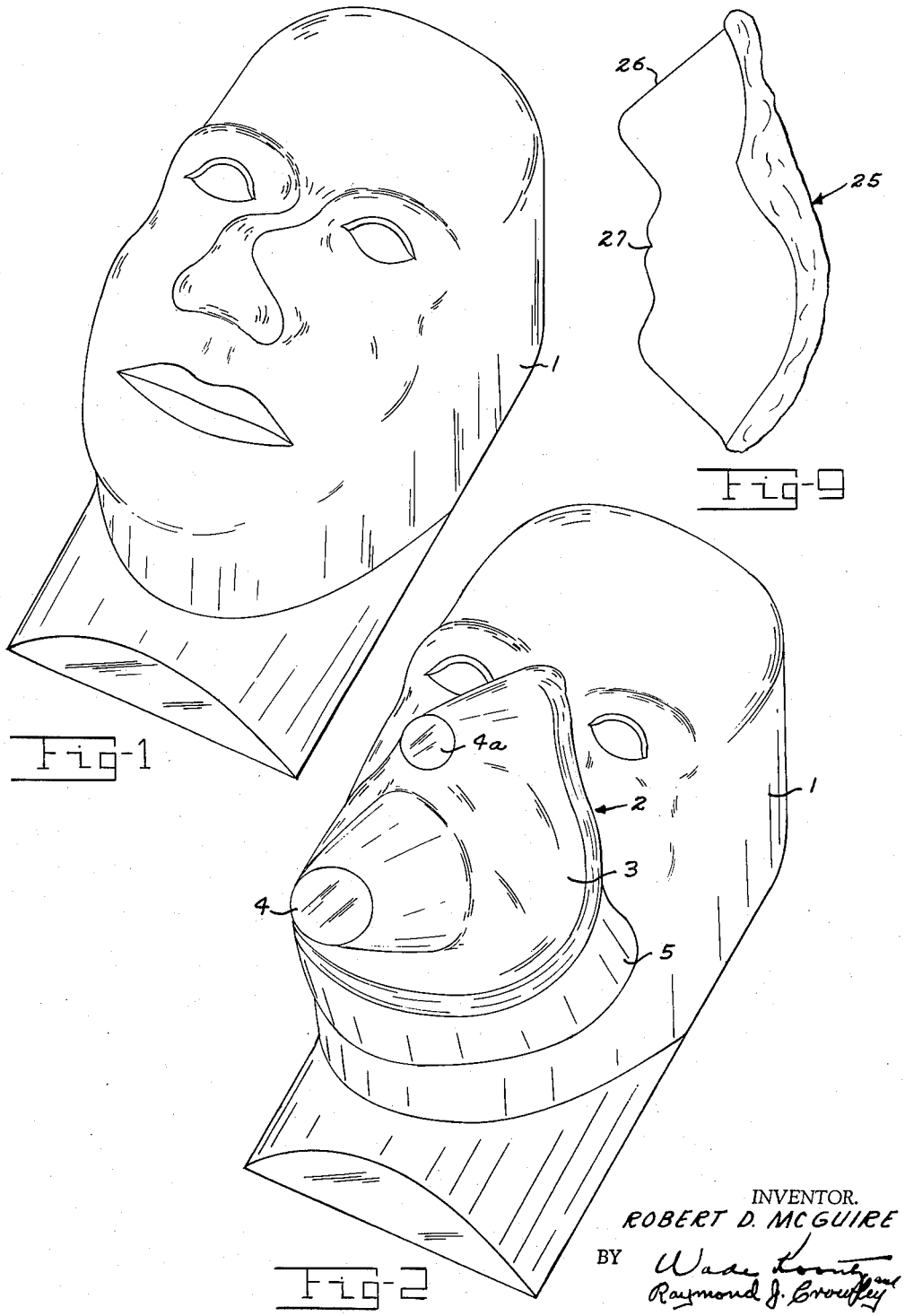
INVENTOR.
ROBERT D. MCGUIRE
BY
ATTORNEYS

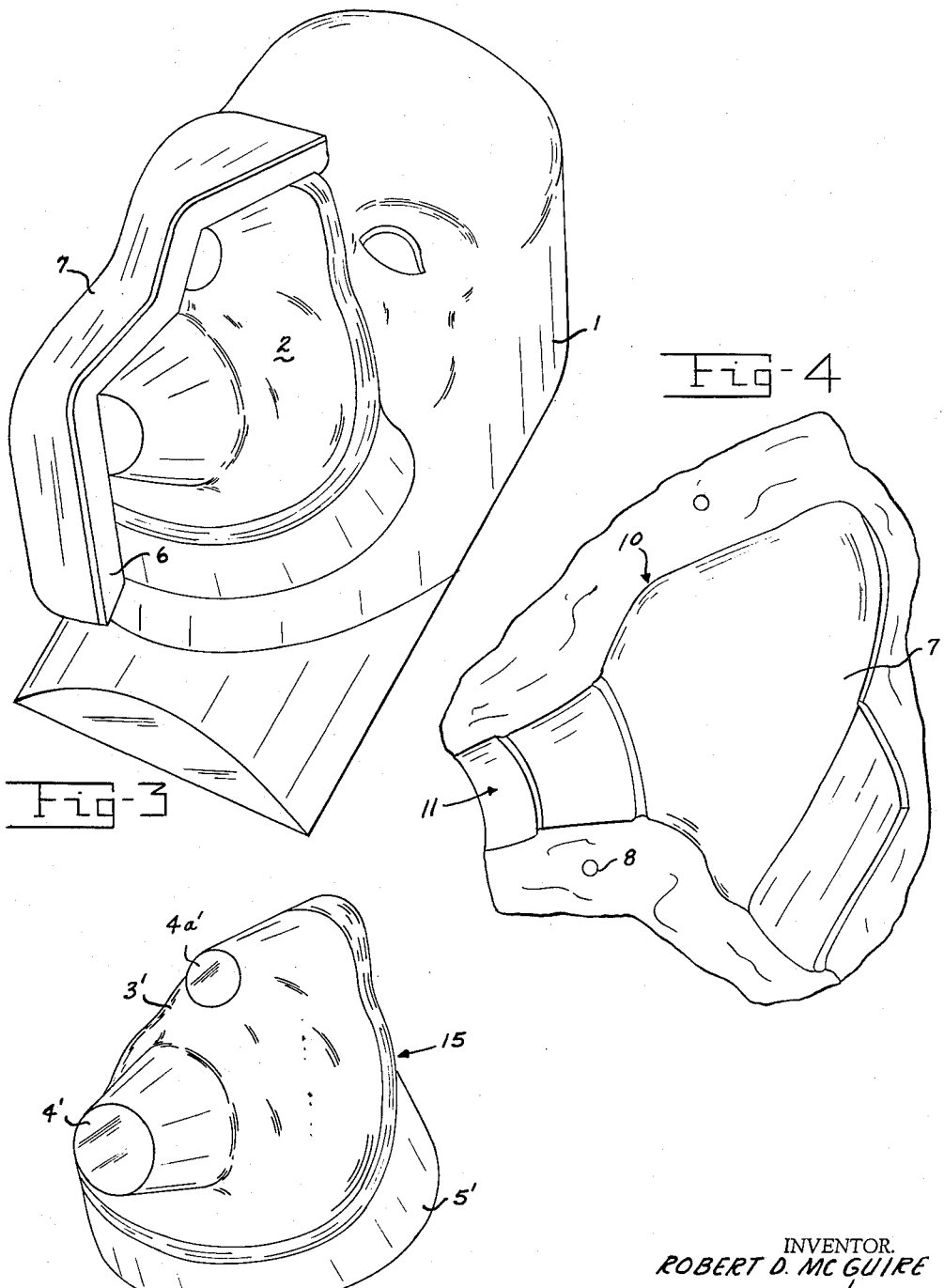

April 4, 1961 R. D. McGUIRE 2,977,636
METHOD OF MOLDING A HOLLOW RUBBER ARTICLE
Filed Aug. 5, 1958 3 Sheets-Sheet 3

INVENTOR.
ROBERT D. MCGUIRE
BY Wade Koontz
Raymond J. Brown
ATTORNEYS

United States Patent Office 2,977,636
Patented Apr. 4, 1961

2,977,636

METHOD OF MOLDING A HOLLOW RUBBER ARTICLE

Robert D. McGuire, 1433 Weaver St., Dayton 8, Ohio

Filed Aug. 5, 1958, Ser. No. 753,396

3 Claims. (Cl. 18—58.7)

(Granted under Title 35, U.S. Code (1952), sec. 266)

The invention described herein may be manufactured and used by or for the United States Government for governmental purposes without payment to me of any royalty thereon.

This invention pertains to a method of forming a hollow article by the dip molding process and in particular relates to the method of making an aviation oxygen mask in which the problem of shrinkage is eliminated and in which varying wall thickness in certain parts is easily attained.

Oxygen masks currently in use in the Air Force are of the pressure demand type including a body portion adapted to fit over the oral-nasal regions of the wearer's face and having in-turned flaps which are operative when mask pressure exceeds atmospheric pressure to form a pressure seal adjacent the area of contact of the mask with the wearer's face. Such a mask, for example, is disclosed in United States Patent 2,415,846 granted February 18, 1947, to Francis E. Randall.

In making experimental and limited production quantities of such masks by the dipping process considerable shrinkage has been encountered and it has not been possible to form the thin inwardly directed sealing flaps integral with the mask body.

In accordance with the invention, by a series of preliminary steps involving the use of a face form or model and a split female mold, a dipping form casting is made which externally conforms to the internal shape of the finished mask and having on its rear face impressions of the regions of the nose and mouth from the face form. The dipping form after preliminary treatment is completely dipped in latex solution until a coating of the desired thickness of the sealing flaps is attained. After the dip coat of latex is dry, plaster is poured into the nasal impression on the dip form until the desired margins of the inwardly directed sealing flaps is reached. When dry the entire form is again dipped in latex until the desired mask body thickness is built up and when dry the latex is vulcanized or cured. While the curing of the latex coating takes place the male plaster dipping form prevents shrinkage of the latex coating. When curing is complete the rubber covering the plaster insert is cut away, the insert is removed and the sealing flap portion cut at its center to allow removal of the dipping form. After suitable trimming the mask is complete.

For a more complete understanding of the invention reference should be made to the detailed description hereinafter given taken in conjunction with the appended drawings in which:

Fig. 1 is an isometric view showing the face form or model on which the mask forms are modelled.

Fig. 2 is a view illustrating the internal form of the mask modelled on the face form.

Fig. 3 is a view similar to Fig. 2 illustrating the casting of the split female mold body on the mask model.

Fig. 4 is a side elevation view of one-half of the split female mold of Fig. 3;

Fig. 5 is perspective view of the dipping form cast in the split female mold;

Fig. 9 is a view in side elevation of the plaster insert; and

Figure 6:
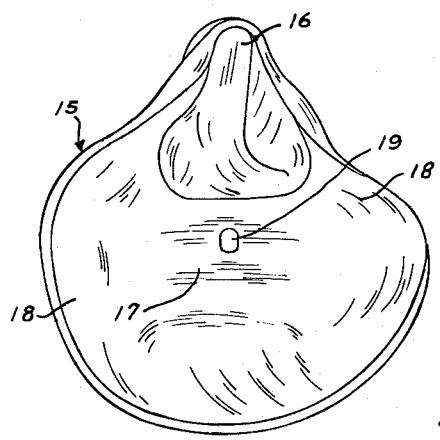
Fig. 6 is a view of the rear face of the dipping form of Fig. 5 showing the facial impressions therein.

Referring now to the drawings and particularly Fig. 1, in this figure there is illustrated a plaster face form 1, which in turn is derived from a master form modelled so as to be an average anatomical representation of a group of people having somewhat similar facial configuration. From statistical anthropology measurements six major face forms have been developed which will represent practically all of the adult male population. There are accordingly six different masks in current use differing only in their shape to fit the different facial configurations.

Having selected a given face form 1, a male mask form 2 is modelled therein from modelling clay so as to appear as shown in Fig. 2. The modelled male form 2 includes a body portion 3 generally enclosing the oral-nasal regions of the face form 1 with a conical forward extension 4 to which the oxygen hose attaches, a protuberance 4a, which provides for housing a microphone, and a lower peripheral face sealing flap 5. This male form corresponds in shape to the interior of the oxygen mask. Where the mask body is similar to an existing mask the male form 2 may be made by placing the existing mask on the face form and pouring in plaster through the oxygen tube extension until the mask interior is filled. The cast may be removed and replaced on the face form and built up with wax or modelling clay until the desired changes are complete. The final result will correspond in either case to Fig. 2.

After the male mask form 2 is complete a modelling clay dividing dam 6 is arranged as shown in Fig. 3 and plaster is built up on one-half of the male form 2 to form one-half of a female mold body indicated at 7 in Figs. 3 and 4. When the female mold half is hard the the dam 6 is removed and a pair of apertures 8, Fig. 4, are formed in the half mold, after coating with a release agent the other half of the female mold 7 is formed by building up with plaster. When hard the female mold 7 is complete and can be separated along its center line into two complementary halves, one having indentations 8 and the other having corresponding projections which serve to locate and lock the mold halves in their proper position. When complete the female mold halves 7 may be removed from the face form and coated with varnish. Each mold half will have a cavity such as indicated at 10 in Fig. 4.

The female mold halves after coating the cavities 10 with a release agent such as petroleum jelly are replaced on the face form and fluid plaster poured in through the opening 11, see Fig. 4. The resulting cast is the plaster male dipping form 15, Fig. 5, which conforms identically in external shape with the male mask form 2, Fig. 2, with corresponding parts indicated by the same reference numerals primed. The male dipping form 15 on its rear face, see Fig. 6, has a female impression 16 corresponding to the nose 17 corresponding to the mouth regions and 18 corresponding to the cheeks. As many of the male dipping forms 15 can be made from the female split mold parts 7 as may be desired, each dipping form is capable of repeated use. The male dipping form 15, Fig. 6, is drilled with a hole 19 in which is inerted a dipping rod 20, see Fig. 7, which is fixed permanently in place. The dipping form 15 is then coated with one or more coats of a pore sealer such as aluminum paint.

Figure 7:
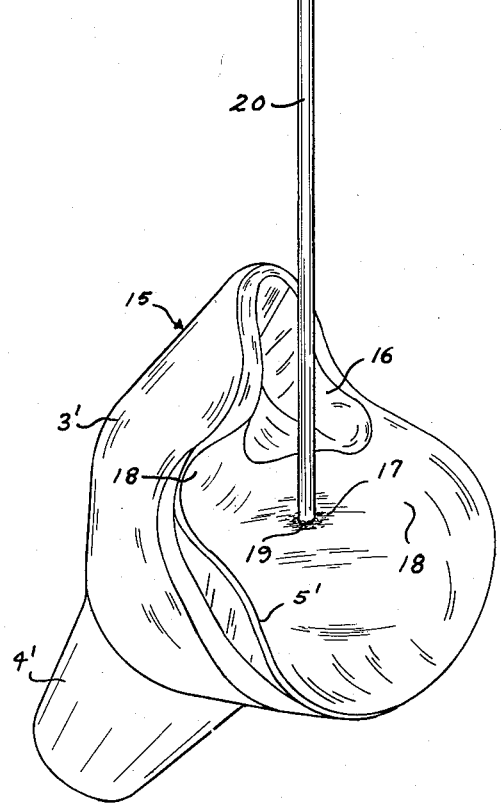
Fig. 7 is a view showing the dipping form of Fig. 5 assembled with a dipping rod.

The male dipping form 15 as in Fig. 7 is then dipped in a suitable coagulating solution for a period of from three to five minutes then removed and allowed to dry for two to three minutes. The dipping form 15 is then suspended by rod 20 over a latex solution tank, not shown, and completely immersed therein for a period of about two minutes. This period of time is dependent upon the desired thickness of the inwardly directed face sealing flaps. The initial coating on the dipping form is then thoroughly dried.

Figure 8:
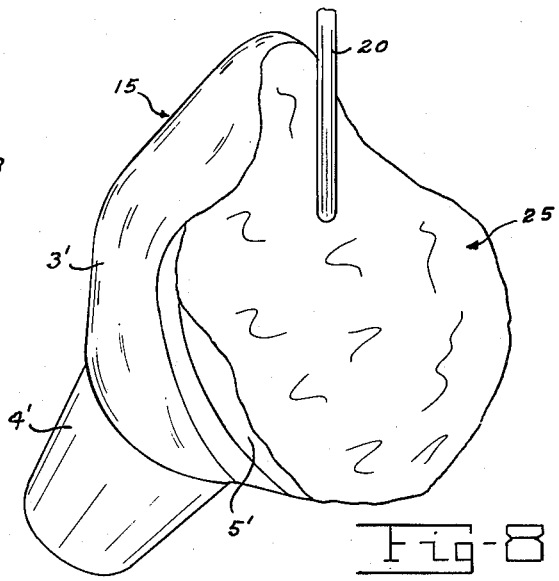
Fig. 8 is a view similar to Fig. 7 showing the filling in of the facial impressions with plaster to form an insert.

The facial impressions 16, 17 and 18, Fig. 6, on the male dipping form 15 are then filled with a fluid plaster mix to form the plaster insert generally indicated by the numeral 25, Fig. 8, and having portions 26, 27 and 28 (see Fig. 9) which are the male counterparts of the impressions 16, 17 and 18 of the dipping form 15. The insert 25 is molded along its peripheral edges so as to conform with the line of juncture of the inward directed flaps with the mask body. The completed dipping form with the plaster insert 25 appears as shown in Fig. 8.

The dipping form 15 with plaster insert 25 (Fig. 8) is returned to the coagulating solution tank and immersed for a time of from three to five minutes, then removed and allowed to dry for three minutes. The dipping form 15 with insert 25 is then returned to the latex tank and immersed for a period of about four to five minutes sufficient to build up the latex coating to the desired final thickness of the mask body. The final coating is then allowed to dry. In the final dip the form 15 and insert 25 will be completely covered with latex. The dipped form 15 after drying is then placed in hot water 200° F. for a period of from one to two hours and then removed and placed in an oven and baked at 150° F. for one hour to complete the cure of the latex. During the curing operation the hard plaster dipping form, totally enclosed by the rubber latex, prevents any shrinkage of the rubber and makes it possible to ensure that the finished mask will accurately dimensionally conform to the required form and will fit the face forms of wearers.

Figure 10:
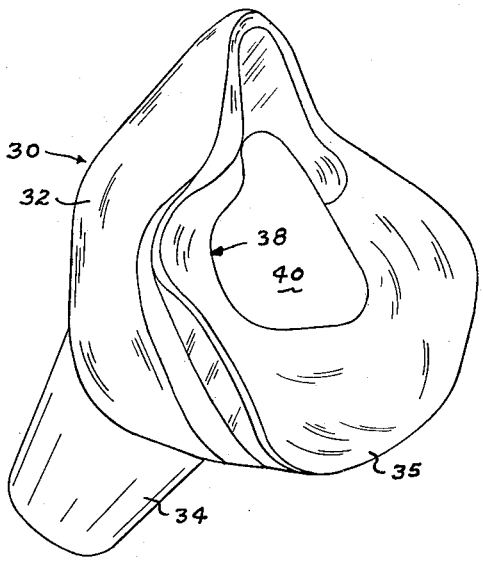
Fig. 10 is a view of the completed oxygen mask.

After curing is complete the layer of rubber covering the plaser insert 25 is trimmed off and the insert is removed. The mask will then appear in the form shown in Fig. 10 and is completed by cutting out a central aperture 40 through which the dipping form 15 may be removed. The completed mask as shown in Fig. 10 is generally indicated by the reference numeral 30 and includes a body portion 32 which is hollow and extends forwardly over the oral nasal sections of the wearer's face and having a hollow conical extension 34 for attachment of an oxygen hose line and valves (not shown). The body portion 32 of the mask has an external face sealing flap 35 extending from the portions engaging the wearer's chin upward to where the cheeks merge with the nose. The thin inwardly directed flap 38 extends from the marginal edges of the mask body 32 and seals against the wearer's face when the pressure within the mask exceeds ambient atmospheric pressure. The central aperture 40 permits the unimpeded entrance of the wearer's mouth and nose into the interior of the mask body. After completion of the mask it may be rubbed with talc to improve the surface finish.

The process herein described is particularly well adapted to limited production of masks of various sizes and can be applied to making hollow rubber articles other than oxygen masks which have an aperture through which the dipping form or core can be removed and by using the plaster insert procedure a thin wall portion can be readily produced.

Having now described the invention it will be apparent that changes may be made therein coming within the scope of the appended claims.

I claim:

1. A method of making an aviator's oxygen mask of the pressure demand breathing type and having an external face sealing flap around the marginal edges of the face fitting portion thereof and with a thin pressure sealing flap extending inward from the mask body for sealing contact with the oral nasal regions consisting of forming a male dipping form conforming to the internal shape of the mask and having a rear wall forming a complement to the shape of the oral nasal regions, dipping said male form in latex to form a thin layer thereover, drying said layer, covering said rear wall with plaster to form an inlay over the regions of the inward directed flap, repeatedly dipping the form assembly in latex solution and drying until the desired thickness of the completed mask has been built up, heating the dipped form to vulcanize the latex thereon, cutting away the vulcanized rubber covering the plaster inlay and removing the inlay, piercing the thin rubber covering to allow for entrance of the nose and mouth and stripping the mask from the male form.

2. A method of repetitive dip molding hollow rubber articles in which the wall thickness of a portion of the article is of lesser thickness than the remainder of the article which consists of making a male dipping form conforming to the desired inner shape of the article, dipping said form in latex solution until a layer is built up corresponding to the desired wall thickness of the portion of reduced wall thickness, drying said latex, covering the portion of reduced wall thickness with a mask, continuing the dipping process until the wall thickness is built up to the desired value, curing the completely dipped article to vulcanize the latex, cutting the cured latex over the masked portion of the form, removing the mask and removing the male dipping form to leave the hollow rubber article.

3. In the method of dip forming rubber articles wherein a portion of the article has a reduced wall thickness relative to the other parts of said article comprising forming a male dipping form conforming to the internal dimensions of the finished article, coating said form with latex until a thickness has been built up equal to the desired thickness in the portion of reduced wall thickness, drying the coating masking the area of desired reduced wall thickness, repeatedly dipping the masked form to build up the desired wall thickness, curing the latex to vulcanize the same, trimming off the cured latex covering the masked portion of the form, removing the mask and removing the completed article from the male dipping form.

References Cited in the file of this patent

UNITED STATES PATENTS

| 1,847,574 | Sigel | Mar. 1, 1932 |
| 1,996,090 | Wilson | Apr. 12, 1935 |
| 2,002,580 | MacDonald | May 28, 1935 |
| 2,013,194 | Vaughn | Sept. 3, 1935 |
| 2,296,105 | Hansen | Sept. 15, 1942 |